United States Patent
Huschke et al.

(10) Patent No.: US 7,436,788 B2
(45) Date of Patent: Oct. 14, 2008

(54) DYNAMIC FREQUENCY SPECTRUM RE-ALLOCATION

(75) Inventors: Joerg Huschke, Nürnberg (DE); Ralf Keller, Wurselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 339 days.

(21) Appl. No.: 10/505,397

(22) PCT Filed: Feb. 25, 2002

(86) PCT No.: PCT/EP02/01973

§ 371 (c)(1),
(2), (4) Date: Feb. 1, 2005

(87) PCT Pub. No.: WO03/071823

PCT Pub. Date: Aug. 28, 2003

(65) Prior Publication Data

US 2005/0128971 A1    Jun. 16, 2005

(51) Int. Cl.
*H04Q 7/20* (2006.01)
(52) U.S. Cl. .............. 370/310; 370/338; 370/341; 455/452.1
(58) Field of Classification Search ......... 370/328–330, 370/341; 455/450–454, 447, 509–513
See application file for complete search history.

(56) References Cited

U.S. PATENT DOCUMENTS

| | | | |
|---|---|---|---|
| 5,034,993 A | | 7/1991 | Sasuta et al. |
| 5,355,374 A | * | 10/1994 | Hester et al. ................. 370/461 |
| 5,448,621 A | * | 9/1995 | Knudsen ..................... 455/427 |
| 5,778,320 A | * | 7/1998 | Drozt et al. .................. 455/509 |
| 5,805,633 A | | 9/1998 | Uddenfeldt |
| 5,812,547 A | * | 9/1998 | Benzimra et al. ........... 370/350 |
| 5,844,894 A | * | 12/1998 | Dent ........................... 370/330 |
| 6,038,214 A | * | 3/2000 | Shionozaki ................. 370/230 |
| 6,519,462 B1 | * | 2/2003 | Lu et al. ...................... 455/453 |
| 6,690,938 B1 | * | 2/2004 | Chin ........................... 455/450 |
| 6,771,595 B1 | * | 8/2004 | Gilbert et al. ............... 370/229 |
| 6,898,431 B1 | * | 5/2005 | Peele ........................... 455/453 |
| 7,099,681 B2 | * | 8/2006 | O'Neill ........................ 455/512 |
| 2001/0049284 A1 | * | 12/2001 | Liu et al. ..................... 455/427 |

(Continued)

FOREIGN PATENT DOCUMENTS

WO    WO 9917575    4/1999

(Continued)

OTHER PUBLICATIONS

European Patnet Office, International Search Report for PCT/EP02/01973, dated Nov. 29, 2002.

*Primary Examiner*—Simon D Nguyen

(57) ABSTRACT

A method of dynamically re-allocating a frequency spectrum to a plurality of radio networks (RNs; 16) in accordance with a predefined spectrum allocation scheme is described. A spectrum resource is previously allocated to each RN (16) or group of RNs (16, 16'). An electronic spectrum request for a RN (16) or a group of RNs (16, 16') is generated and transmitted via a communications network (18) to a server infrastructure (12) which also receives electronic spectrum requests for other RNs (16), the server infrastructure (12) processing the received electronic spectrum requests in accordance with the spectrum re-allocation scheme to re-allocate the spectrum resources to the plurality of RNs (16).

18 Claims, 2 Drawing Sheets

U.S. PATENT DOCUMENTS

| | | | |
|---|---|---|---|
| 2002/0147022 A1* | 10/2002 | Subramanian et al. | 455/453 |
| 2003/0095562 A1* | 5/2003 | Liu et al. | 370/442 |
| 2003/0118006 A1* | 6/2003 | Yang et al. | 370/352 |

FOREIGN PATENT DOCUMENTS

| | | | |
|---|---|---|---|
| WO | WO 9917575 A | 4/1999 |
| WO | WO 0223758 | 3/2002 |
| WO | WO 0223758 A | 3/2002 |

* cited by examiner

DYNAMIC FREQUENCY SPECTRUM RE-ALLOCATION

BACKGROUND OF THE INVENTION

1. Technical Field

The invention relates to the field of allocating a frequency spectrum to a plurality of radio networks. More particularly, the invention departs from the situation that a spectrum resource has previously been allocated to each radio network or to a group of radio networks and proposes a method and a system for dynamically re-allocating the frequency spectrum.

2. Technical Background

In recent years wireless communications expanded rapidly and the current development shows clear signs of accelerated future growth. However, future growth is limited by the fact that the total frequency spectrum that is made available for wireless communications cannot keep pace with the increasing demands. There have thus been various approaches like channel splitting or advanced speech and data coding to improve spectrum efficiency. Additionally, technical improvements enable wireless communications to advance into increasingly higher frequency regions. In spite of all these attempts, spectrum resources have become scarce.

Due to the steadily increasing spectrum demands spectrum allocation has become an important topic. Basically, spectrum allocation belongs to the category of problems that concern the distribution of a scarce resource to a set of individuals having different demand for the resource.

In the past several approaches like beauty contests and auctions have been employed in order to allocate a frequency spectrum to a certain number of competing spectrum applicants (e.g. operators) for usage by their radio networks (RNs).

A beauty contest is a spectrum allocation scheme which is generally based on the spectrum applicant's prospects of the spectrum usage over several years and also on the related interests of governments. The complex nature of such beauty contests requires a long-term allocation of the spectrum resources.

As an alternative to beauty contests many governments have made use of auctioning schemes. Such schemes involve the auctioning of a plurality of spectrum licenses for typical license periods ranging from ten to twenty years. The settlement price of such auctions reflects the expected earnings from the services provided in the licensed spectrum over the license period.

As has become apparent from the above, the currently practiced long-term spectrum allocation schemes are not appropriate for dynamic spectrum allocation. If for example technical developments necessitate short-term re-allocations of the frequency spectrum allocated by means of the spectrum allocation schemes discussed above, such re-allocations cannot be dynamically performed today.

There is, therefore, a need for a method and a system for dynamically re-allocating a frequency spectrum to a plurality of RNs, which is more flexible and can easily be adapted to the ever-changing demand for spectrum resources.

SUMMARY OF THE INVENTION

According to the invention this need is satisfied by a method of dynamically re-allocating an at least partially continuous frequency spectrum to a plurality of RNs in accordance with a pre-defined spectrum re-allocation scheme, wherein a spectrum resource has previously been allocated to each RN and wherein the method comprises generating an electronic spectrum request for a RN and transmitting the electronic spectrum request via a communications network to a server infrastructure which also receives electronic spectrum requests for other RNs, the server infrastructure processing the received electronic spectrum requests in accordance with the spectrum re-allocation scheme in order to re-allocate the spectrum resources to the plurality of RNs.

In contrast to dynamic frequency re-allocation schemes like Dynamic Frequency Selection (DFS), which re-allocate a single frequency within the spectrum resource available to a single RN, the invention proposes to dynamically re-allocate a continuous frequency spectrum. This continuous frequency spectrum is re-allocated among two or more RNs.

The invention departs from the situation that a frequency spectrum has already been allocated to a plurality of RNs, for example by means of one of the long-term spectrum allocation schemes known in the art or any other allocation scheme, and proposes to continue with a dynamic spectrum re-allocation scheme that is based on electronic spectrum requests submitted to a central authority via a communications network. The central authority evaluates the received spectrum requests preferably in real-time and re-allocates spectrum resources to individual RNs or individual groups of RNs. The use of electronic spectrum requests and the automated evaluation thereof constitutes the framework which enables the implementation of dynamic, i.e. short-term, re-allocations of a frequency spectrum.

According to the dynamic nature of this invention, re-allocations may be performed continuously, for example on a day-to-day basis, or at least quasi-continuously like during scheduled re-allocation periods. Compared to the current re-allocation periods ranging between ten and twenty years the quasi-continuous re-allocations are performed in much shorter intervals of preferably one year or less. In the case re-allocation is performed quasi-continuously, specific submission periods may be defined during which the electronic spectrum requests may be submitted to or are accepted by the server infrastructure. Such submission periods may range between one or more days and several weeks or months.

Due to the dynamic nature of the spectrum re-allocation, technical needs of RNs and economical needs of RN operators can be satisfied almost in real-time in the case the re-allocation is performed continuously. If the re-allocation is performed quasi-continuously, the operators may still plan more flexibly because they basically have only to consider their spectrum needs until the next spectrum re-allocation process.

The electronic spectrum request submitted to the server infrastructure may comprise an indication of the specific size of the spectrum resource requested for a particular RN. Alternatively, it may simply indicate that a spectrum resource is needed for a particular RN without specifying the size.

The electronic spectrum request is generated on the basis of various considerations. One of those considerations may be the service quality of a RN, which also depends on the actual or predicted traffic on the RN's spectrum resource. The electronic spectrum request may thus be generated in dependence of the service quality. This means that if for example the operator of a RN expects increasing traffic on his RN, he may submit an electronic spectrum request that takes this additional traffic into consideration and vice versa. Apart from the service quality, or in addition to the service quality, aspects like improved spectrum efficiency of a particular RN or strategic considerations may also form the basis for a specific electronic spectrum request.

In most cases the spectrum resource available to a particular RN can only be increased at the expense of the spectrum resource currently allocated to one or more other RNs. Re-allocation therefore necessitates that the whole frequency spectrum or at least a portion thereof is dynamically reallocated among the RNs.

If only a portion of the frequency spectrum is to be reallocated, a specific re-allocation ratio may be defined. This re-allocation ratio indicates the portion of the previously allocated frequency spectrum that is to be dynamically re-allocated, whereas the remaining portion of the total frequency spectrum is not subjected to the re-allocation process.

In the case only a portion of the frequency spectrum is reallocated, this portion has to be taken from the individual RNs' spectrum resources. This is preferably done in accordance with a predefined contribution scheme. This predefined contribution scheme may for example define that each RN has to contribute the same spectrum amount or that each RN contributes a spectrum amount that is proportional to the spectrum resource currently allocated to this RN.

The spectrum re-allocation scheme underlying the dynamic re-allocation process has to be chosen such that short-term allocation is rendered possible. Various re-allocation schemes fulfill this requirement.

According to a first exemplary variant, the spectrum re-allocation scheme is based on spectrum credits that relate to elementary spectrum units. According to this spectrum re-allocation scheme, each RN or group of RNs may be assigned the same or an individual number of spectrum credits that are exchangeable into a specific spectrum resource. An electronic spectrum request in this spectrum re-allocation scheme may thus comprise a specification of a particular number of spectrum credits representative of the requested spectrum resource.

Preferably, the communications network linking the RN to the server's infrastructure (and, if required, additionally linking individual RNs) and the system as a whole are configured such that they allow to reassign the spectrum credits among the plurality of RNs. Such an implementation enables spectrum credit trading and thus guarantees an economically equitable access to spectrum resources. In order to prevent specific RNs from blocking other RNs, the spectrum credits may have a limited temporal validity. Furthermore, the number of spectrum credits that may be allocated to a specific RN could be limited.

According to a second exemplary embodiment, the re-allocation scheme may be auction-based such that the electronic spectrum requests submitted via the communications network comprise electronic bids. The frequency spectrum to be re-allocated may be auctioned as a single bundle or it may be divided into a plurality of frequency bundles which are auctioned separately. The electronic bids may relate to one or more frequency bundles comprised within the frequency spectrum.

A specific frequency bundle may be re-allocated to this RN or this group of RNs associated with the best electronic bid. The best electronic bid need not necessarily be the bid specifying the highest price. Instead, the best electronic bid may be determined on the basis of one or more further parameters like the RN's previous quality of service.

Once one or more specific frequency bundles have been auctioned by the RN associated with the best electronic bid, it might become necessary to re-allocate these one or more frequency bundles, or a part thereof, prior to the next (scheduled) re-allocation process in which all RNs take part. Such a situation may arise for example if the RN associated with the best electronic bid is not willing to use or not capable of using the obtained spectrum resource adequately because the spectrum resource was primarily acquired to block other RNs. In order to prevent sub-optimal quality of service, one or more frequency bundles might be de-associated from this RN in exchange for a predefined penalty or restitution. The penalty may be of a financial nature.

According to a further aspect of the auctioning scheme the frequency spectrum to be auctioned may be partitioned bid-proportionally. This means that a larger spectrum resource is re-allocated to a RN associated with a better bid and vice versa. In order to avoid fragmentation, a minimum quantity for an acceptable electronic bid or a minimum partition size may be defined or dynamically specified.

The submission of the electronic bids may be performed in a single round or in a plurality of subsequent rounds. In the latter case the electronic bids submitted by an operator of a specific RN are submitted iteratively in response to previous electronic bids submitted by operators of other RNs.

The invention can be implemented as a hardware solution or as a software solution. The software solution includes a computer program product comprising program code portions for performing the method set out above. The computer program product may be stored on a computer readable recording medium like a hard disc, a CD-ROM, a floppy disk or on any other storage device.

The hardware solution is constituted by a system for dynamically re-allocating a frequency spectrum to a plurality of RNs, the system including a communications network and at least one RN infrastructure with one or more RNs, means for generating an electronic spectrum request, and means for transmitting the electronic spectrum request via the communications network. The system further includes a server infrastructure in communication via the communications network with the at least one RN infrastructure, the server infrastructure having means for receiving electronic spectrum requests and means for processing the received electronic spectrum requests in accordance with the spectrum re-allocation scheme to re-allocate the spectrum resources to the plurality of RNs. Preferably, the system is configured as an electronic auction network.

The invention may also be realized in the form of a RN infrastructure configured to communicate with a server infrastructure and vice versa

BRIEF DESCRIPTION OF THE DRAWINGS

Further advantages of the invention will become apparent upon reference to the following description of preferred embodiments of the invention in the light of the accompanying drawings, in which.

DESCRIPTION OF PREFERRED EMBODIMENTS

In the following the invention is exemplarily set forth with respect to RNs operating in licensed spectrum bands. The RNs can be constituted by mobile radio networks (GSM, TDMA, PDC, CDMA, EDGE, WCDMA etc.), broadcast networks (DVB, DAB, etc.) or fixed access networks (LDMS etc.).

Figure 1:
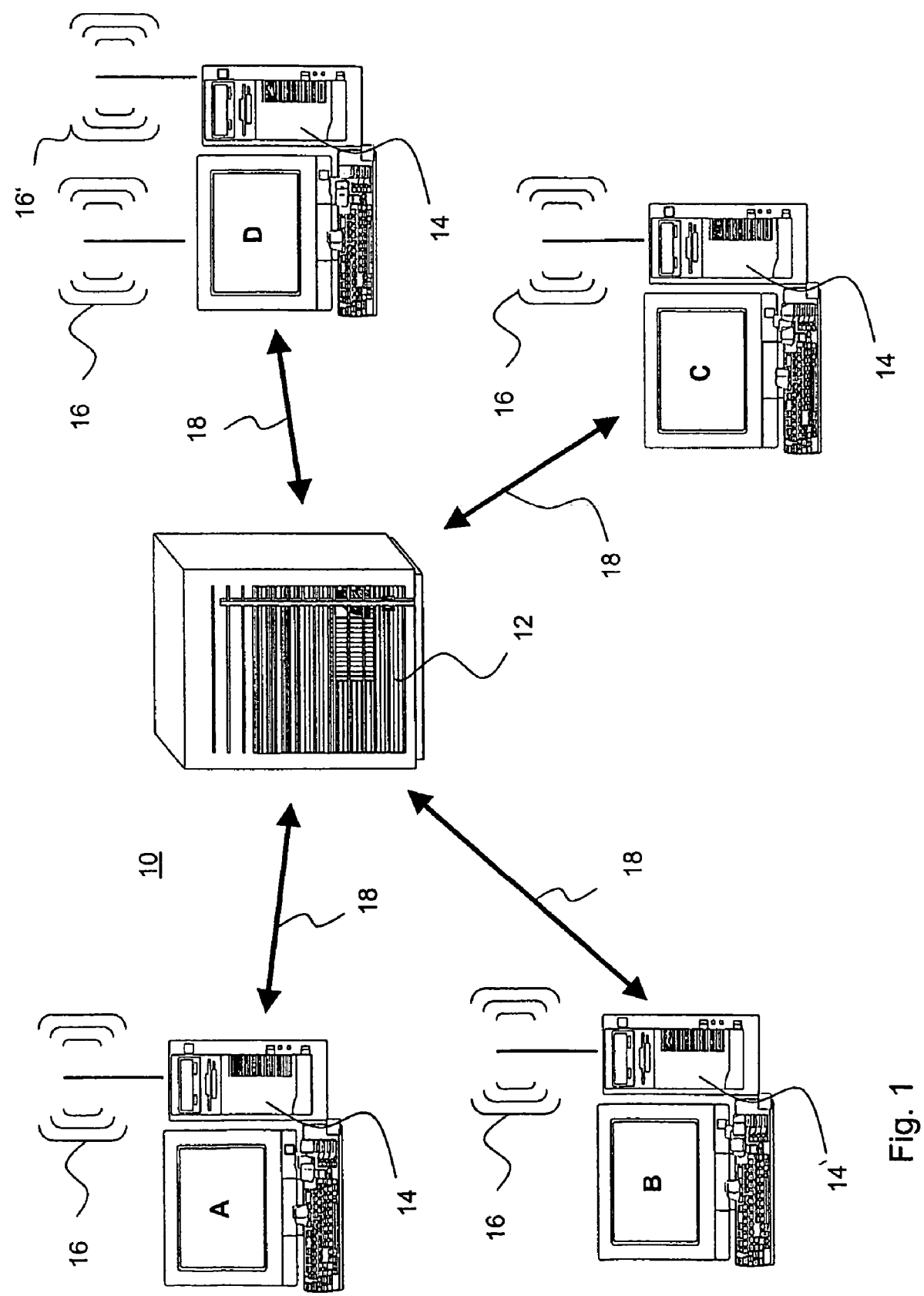
FIG. 1 shows a schematic view of a system according to the invention for dynamically re-allocating a frequency spectrum.

In FIG. 1 a system 10 according to the invention for dynamically re-allocating a frequency spectrum to a plurality of RNs 16, 16' in accordance with a predefined spectrum re-allocation scheme is depicted. The system 10 comprises a server infrastructure 12 associated with a plurality of RN infrastructures A, B, C, D. The number of RN infrastructures associated with the server infrastructure 12 may be limited, preferably to a maximum number of ten RN infrastructures. In the embodiment depicted in FIG. 1, the server infrastructure 12 is associated with four RN infrastructures A, B, C, D.

Each of the RN infrastructures A, B, C, D depicted in FIG. 1 is operated by a different RN operator and comprises a client component 14 and at least one RN 16, 16'. The client component 14 allows to generate an electronic spectrum request and includes an interface device for transmitting the generated electronic spectrum request to the server infrastructure 12.

The client components 14 and the server infrastructure 12 communicate via a communications network 18. The communications network 18 may be a public network like the Internet or a dedicated internal network for frequency spectrum re-allocation purposes. If the communications network 18 is constituted by a public network, security requirements may necessitate an encrypted communication between the client components 14 and the server infrastructure 12. Additional components like firewalls, proxy servers and demilitarized zones (DMZ) could be used to prevent unauthorized access to the client components 14 or the server infrastructure 12. In order to improve authorization security, each client component 14 could be provided with smart card technology including a secure and user-controllable card reader (not depicted in FIG. 1).

It should be noted that in the embodiment depicted in FIG. 1 the client components 14 can communicate with each other via the communications network 18 and the server component 12. The server component 12 functions as a central authority that controls the communication among the client components 14. In principle, the client components 14 could communicate directly with each other if direct communication links between the client components 14 are provided.

Any electronic spectrum requests transmitted from the client components 14 via the communications network 18 to the server infrastructure 12 are received by an appropriately configured interface device of the server infrastructure 12 and are processed in accordance with a predefined spectrum re-allocation scheme by a processing device of the server infrastructure 12. In the course of this processing, spectrum re-allocation information is generated and transmitted back via the communications network 18 to the client components 14.

Figure 2:
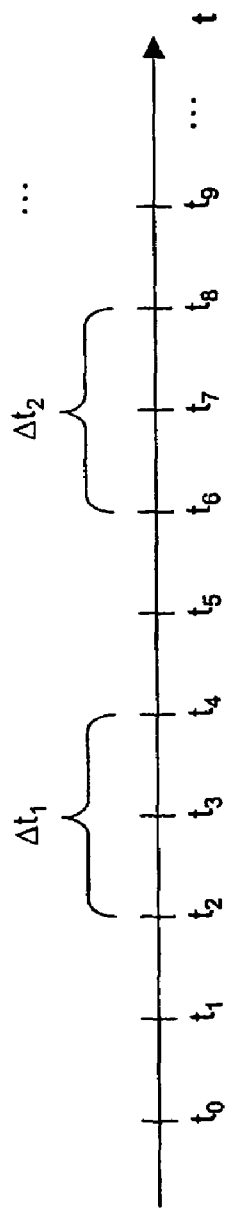
FIG. 2 schematically shows the course of a quasi-continuous spectrum re-allocation according to the invention (time axis)
Figure 3:
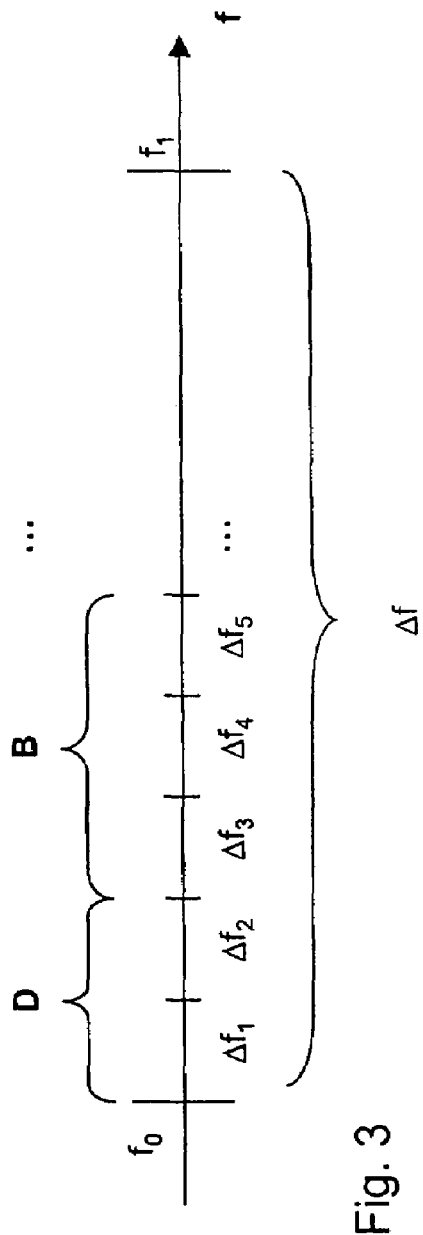
FIG. 3 schematically shows the frequency spectrum to be re-allocated to a plurality of radio network infrastructures (frequency axis).

Prior to considering some exemplary dynamic spectrum re-allocation schemes in more detail, some exemplary generic aspects of all schemes will be considered with reference to FIGS. 2 and 3.

In FIG. 2 an exemplary quasi-continuous re-allocation scheme is described with reference to a time axis t. At an initial point in time $t_0$ it is assumed that the frequency spectrum is already completely or at least partially allocated to the four RN infrastructures A, B, C, D depicted in FIG. 1. The operators of the RN infrastructures A, B, C, D have been informed that the frequency spectrum or at least a part thereof is re-allocated starting from a point in time $t_5$ and that electronic spectrum requests for desired spectrum resources may validly be transmitted, and are accepted by the server infrastructure 12, during a time interval $\Delta t_1$ preceding $t_5$. The next re-allocation takes place at $t_9$ and electronic spectrum requests relating to $t_9$ may be validly submitted during $\Delta t_2$. Starting from $t_5$, the re-allocation is performed quasi-continuously in constant time intervals of four time units, i.e. $t_9-t_5$. One time unit $(t_i-t_{i-1})$ may correspond to for example one week or one month.

According to an embodiment not shown in the drawings the re-allocation process could also take place continuously and may for example involve only two of the RN infrastructures A, B, C, D depicted in FIG. 1.

For example an RN infrastructure which requires a larger spectrum resource may at any point in time transmit a corresponding electronic spectrum request to the server infrastructure 12, which forwards the electronic spectrum request or processes the electronic spectrum request and forwards the processed electronic spectrum requests to one or more of the further RN infrastructures. Should one or more RNs infrastructures be willing to abandon a part of their spectrum resources, they may notify the server infrastructure 12 accordingly via the communications network 18. The server infrastructure 12 may then immediately (i.e. not bound by fixed points in time $t_i$) re-allocate the spectrum resources appropriately between the RN infrastructure requesting the spectrum resource and the one or more RNs infrastructure willing to abandon their spectrum resources.

In FIG. 3 a possible outcome of a re-allocation process is exemplarily depicted. In the embodiment shown in FIG. 3 the frequency spectrum $\Delta f$ to be dynamically re-allocated is arranged between the lower frequency limit $f_0$ and the upper frequency limit $f_1$. It is assumed that the frequency spectrum $\Delta f$ has been divided into equidistant frequency blocks $\Delta f_1$, $\Delta f_2$ . . . which in the exemplary embodiment depicted in FIG. 3 constitute elementary spectrum units. Of course, the frequency spectrum $\Delta f$ could also be divided non-equidistantly.

As becomes apparent from FIG. 3, RN infrastructure D of FIG. 1 has been allocated two elementary spectrum units, namely $\Delta f_1$ and $\Delta f_2$. RN infrastructure B of FIG. 1 has been allocated three elementary spectrum units, and the remaining RN infrastructures A and C share the remaining elementary spectrum units not explicitly shown in FIG. 3.

In principle, the frequency spectrum $\Delta f$ could also be fragmented. However, it is assumed here that such a fragmentation can be removed by appropriate defragmentation processes.

In the following description, two dynamic spectrum re-allocation schemes, namely a short-term auctioning scheme and a spectrum credit based scheme, will be described in more detail.

1. Short-Term Auctioning Scheme

According to the short-term auctioning scheme, the operators of the RN infrastructures A, B, C, D of FIG. 1 participate in an electronic auction by submitting electronic spectrum requests in the form of electronic bids. The electronic bids can be submitted in a single round or iteratively in multiple rounds.

As depicted in FIG. 2, bidding is performed during predetermined periods of time $\Delta t_i$. The spectrum resources to be auctioned during $\Delta t_i$ are taken from spectrum resources the operators have obtained prior to the beginning of $\Delta t_i$. The size of the total spectrum resources available for auctioning is not discussed here further.

1.1 Bid-proportional Spectrum Partitioning

In the following a bid-proportional re-allocation of the spectrum resources available for bidding is described. According to this embodiment, the entire frequency spectrum that is available for dynamic re-allocation is auctioned during each scheduled auctioning interval $\Delta t_i$. During each interval $\Delta t_i$ each operator places bids for a portion of the available frequency spectrum.

In the case all participating operators refrain from revising their bids further, or in the case the time interval $\Delta t_i$ has expired, the total amount of the offered frequency spectrum is partitioned directly in proportion to the bids of the individual operators and distributed to the operators accordingly. However, in order to avoid fragmentation effects, the total number of partitions is limited and a specific minimum size of each partition is to be specified.

During the bidding process, each operator i can determine the spectrum partition $S_i$ he would get from the total amount of dynamically re-allocated frequency spectrum S for his bid $B_i$ if the other operators j would stick to their bids $B_j$ in accordance with the following exemplary formula:

$$S_i = f(B_i) = \frac{B_i}{B_i + \sum_{j \neq i} B_j} S$$

The price $B_i$ an operator is willing to pay thus directly determines the size of the spectrum resource the operator will receive. Each operator will consider in his bids the individual revenue he expects to get from the spectrum resource he desires in the time interval between two subsequent re-allocations.

At the end of the auction the operators are informed of the spectrum resource re-allocated to their respective RN and requested to pay in accordance with their (last) bid. The total amount paid or a fraction thereof may be refunded to the operators at the end of each auctioning process or to third parties such as the government. The scheme according to which the amount is returned to the operators is preferably configured such that an individual operator cannot predict how much he will get back. The reason therefore is the fact that if the operator could predict the refunding, he would take this into account when placing his bids, which is not desirable.

1.2 Bidding for Predefined Frequency Bundles

According to a further variant, the frequency spectrum to be dynamically re-allocated is divided into one or more frequency bundles that are individually auctioned among the operators. The frequency bundles may have all the same size or different sizes. For example each frequency bundle to be auctioned may correspond to a frequency block $\Delta f_i$ as depicted in FIG. 3 or a multiple thereof.

The operators place electronic bids during predetermined submission periods $\Delta t_i$ (see FIG. 2) for individual frequency bundles $\Delta f_i$ (see FIG. 3). The price an operator is willing to pay for a frequency bundle is influenced by his individual business case and other prospects from the usage of the frequency bundle between two subsequent re-allocations.

According to an important aspect of this embodiment, the effects of electronic bids placed by operators aiming solely at driving the price are alleviated after the auction process has ended and prior to the subsequently scheduled auctioning process. This will now be illustrated in more detail.

Generally, the operator with the best (for example the highest) final bid for a specific frequency bundle has the right to buy this frequency bundle. If he exploits his right, the amount he pays might be given to the remaining but out-bidded operators or to third parties. On the other hand, if the operator with the best final bid is not interested in actually buying the frequency bundle this operator is given the possibility to refrain from buying the frequency bundle in order to avoid the situation that spectrum resources remain unused that are required by other operators to ensure optimal quality of service.

However, the operator may only refrain from buying the frequency bundle if he pays a certain fine. This fine should be lower than the loss the operator would face if he had bought the frequency bundle because if the fine were higher, the operator would rather buy the frequency bundle than paying the fine. However, if the operator would rather buy the frequency bundle than paying the fine, the frequency bundle is not optimally used. This can be avoided by appropriately selecting the amount of the fine.

The amount of the fine should be set so large that the operator is just expected to select the fine with a high probability. Preferably, the amount of the fine is a certain fraction of the operator's bit. The fine paid by an operator can be distributed among the other, out-bided operators according to a specific distribution scheme.

If the operator with the best bid chooses not to buy a frequency bundle, the operator with the second best bid is given two alternatives: The operator with the second best bid may either buy this frequency bundle at the price of his last bid or he may not buy this frequency bundle and pass the frequency bundle to the operator with the third best bid. The operator with the third best bid then has the same alternatives like the operator with the second best bid. The remaining operators that have bided may thus also decline from buying the frequency bundle, but in contrast to the operator with the best bid they are not fined for declining. The reason for this is the fact that the fine is only needed to discourage each operator from placing a better bid than the current best bid if the value of the auctioned frequency bundle to him is less than the amount of the bid placed by him.

2. Spectrum Credit Based Re-allocation Scheme

This spectrum re-allocation scheme is based on spectrum credits that relate to elementary spectrum units, for example the frequency intervals $\Delta f_i$ depicted in FIG. 3.

In this scheme each operator, i.e. each RN infrastructure A, B, C, D depicted in FIG. 1, can acquire or simply receives from the server infrastructure 12, which acts as spectrum broker, a specific amount of spectrum credits. The obtained amount of spectrum credits enables using on the average a certain spectrum resource $M_i$ when a certain spectrum (see for example $\Delta f$ in FIG. 3) is dynamically re-allocated. The temporal validity of the spectrum credits is limited by introducing a validity period T.

The spectrum credits $SC(M_i)$ are given to each operator i at the beginning of each period T and expire at the end of T. If it is assumed that $M_i$ represents a fraction of the spectrum to be re-allocated and further that n RN infrastructures participate in the re-allocation process, the sum of all $M_i$ ($1 \leq i \leq n$) equals 1. This means that all operators i may use exactly the spectrum resource $M_i$ in T without any conflict. In an enhanced scheme, also larger sums than 1 are possible.

If for example an operator i wants to use a spectrum resource $N_i$ of the frequency spectrum $\Delta f$ during a period t'<T, the operator i must spend $$SC(N_i) = (N_i/M_i) * (t'/T) * SC(M_i)$$

spectrum credits. The operator i thus has enough spectrum credits in order to use either constantly the spectrum resource $M_i$ during T, or to use a larger spectrum resource for a shorter period t'<T and a smaller spectrum resource in the remaining duration of T. Spectrum credits that have not been spent at the end of T are invalidated and cannot be used in a subsequent period T.

Conflicts that may arise in the case where several or all operators want to spend in t' more spectrum credits, i.e. want to use a larger spectrum amount, than available in Δf. Such conflicts must be resolved in a predetermined manner, for example according to the first-come-first-served principle, according to the short term auctioning mechanism described above or according to other schemes.

Spectrum credits can be re-assigned among the client components 14 via the server infrastructure 12 depicted in FIG. 1 or directly between the client components 14. For example, a RN infrastructure may acquire spectrum credits from another RN infrastructure, thus increasing its future spectrum resources. Of course, the spectrum resources of the further RN infrastructure will decrease accordingly. This corresponds to a trading of spectrum credits.

Misbehavior of operators has to be prevented. This can be accomplished by setting upper limits on the number of spectrum credits that can be assigned to an individual RN infrastructure. It can thus be prevented that one operator which has saved or acquired more spectrum credits than other operators prevents the other operators in t' from using any spectrum resources.

The embodiments described above ensure fair spectrum usage policies, especially on a spectrum market with a small number of participants. The spectrum re-allocation scheme of short-term auctioning achieves that the operators can aim at the exact amount of spectrum resource that is needed, while ensuring that the totally available spectrum resource is allocated such that it is used in the most efficient way. The spectrum re-allocation scheme of spectrum credits, that can be spent, saved or traded, ensures that an RN can always use a specific spectrum resource.

Modification and alternative embodiments of the invention are contemplated which do not depart from the spirit and the scope of the invention as defined by the foregoing teaching and appended claims. It is intended that the claims cover all such modifications that fall within their scope.

The invention claimed is:

1. A method of dynamically re-allocating a frequency spectrum to a plurality of radio networks (RNs) in accordance with a predefined spectrum allocation scheme, wherein a spectrum resource has previously been allocated to each RN or group of RNs comprising:
generating an electronic spectrum request for a RN or a group of RNs, wherein the spectrum allocation scheme is based on spectrum credits assigned with the RN or group of RNs, the spectrum credits relating to elementary spectrum units and being exchangeable into spectrum resources; and
transmitting the electronic spectrum request via a communications network to a server infrastructure which also receives electronic spectrum requests for other RNs, the server infrastructure processing the received electronic spectrum requests in accordance with the spectrum re-allocation scheme and in accordance with the spectrum allocation scheme to reallocate the spectrum resources to the plurality of RNs.

2. The method of claim 1, wherein the re-allocation is performed continuously or wherein the re-allocation is performed quasi-continuously.

3. The method of claim 2, further comprising determining a service quality of one of the RNs taking into account the actual or predicted traffic on the RN's spectrum resource and generating the electronic spectrum request in dependence of the service quality.

4. The method of claim 3, wherein the whole frequency spectrum is re-allocated.

5. The method of claim 3, wherein only a portion of the frequency spectrum is re-allocated and wherein the portion of the frequency spectrum to be re-allocated is taken from the individual RNs' spectrum resources according to a predefined contribution scheme.

6. The method of claim 1, wherein each RN or group of RNs is assigned the same or an individual first number of spectrum credits and wherein an electronic spectrum request for an RN comprises a specification of a second number of spectrum credits representative of the requested spectrum resource.

7. The method of claim 6, wherein the communications network allows to reassign the spectrum credits among the plurality of RNs.

8. The method of claim 7, wherein the spectrum credits have a limited temporal validity.

9. The method of claim 8, wherein the spectrum re-allocation scheme is auction-based and wherein the electronic spectrum requests comprise electronic bids submitted via the communications network.

10. The method of claim 9, wherein the electronic bids relate to one or more frequency bundles comprised within the frequency spectrum and wherein a specific frequency bundle is re-allocated to the RN associated with the best electronic bid.

11. The method of claim 10, wherein, prior to the next re-allocation process for all RNs, the specific frequency bundle or a part thereof re-allocated to the RN or group of RNs associated with the best electronic bid is allocated to another RN or group of RNs.

12. The method of claim 9, wherein the frequency spectrum to be re-allocated is partitioned bid-proportionally.

13. The method of claim 12, wherein the electronic bids are submitted iteratively.

14. A computer readable medium storing a computer program for dynamically re-allocating a frequency spectrum to a plurality of radio network in accordance with a predefined spectrum allocation scheme, wherein a spectrum resource has previously been allocated to each RN or group of RNs, comprising: program code portions for generating an electronic spectrum request for a RN or a group of RNs, wherein the spectrum allocation scheme is based on spectrum credits assigned with the RN or group of RNs, the spectrum credits relating to elementary spectrum units and being exchangeable into spectrum resources; and transmitting the electronic spectrum request via a communication network to a server infrastructure which also receives electronic spectrum requests for other RNs, the server infrastructure processing the received electronic spectrum request in accordance with the spectrum re-allocation scheme and in accordance with the spectrum allocation scheme to reallocated the spectrum resources to the plurality of RNs.

15. A system for dynamically re-allocating a frequency spectrum to a plurality of radio networks (RNs) in accordance with a predefined spectrum re-allocation scheme, wherein a spectrum resource has previously been allocated to each RN or group of RNs, comprising:
a communications network;
at least one RN infrastructure with one or more RNs, means for generating an electronic spectrum request, wherein the spectrum allocation scheme is based on spectrum credits assigned with the RN or group of RNs, the spectrum credits relating to elementary spectrum units and being exchangeable into spectrum resources, and means for transmitting the electronic spectrum request via the communications network; and a server infrastructure in communication via the communications network with the at least one RN infrastructure, the server infrastructure having means for receiving electronic spectrum requests and means for processing the received electronic spectrum requests in accordance with the spectrum re-allocation scheme and in accordance with the spectrum allocation scheme to re-allocate the spectrum resources to the plurality of RNs.

16. The system of claim 15, configured as an electronic auction network.

17. A server infrastructure for dynamically re-allocating a frequency spectrum to a plurality of radio networks (RNs) in accordance with a predefined spectrum re-allocation scheme, wherein a spectrum resource has previously been allocated to each RN or group of RNs, comprising:

means for receiving electronic spectrum requests in communication via a communications network with at least one RN infrastructure, wherein the spectrum allocation scheme is based on spectrum credits assigned with the RN or group of RNs, the spectrum credits relating to elementary spectrum units and being exchangeable into spectrum resources; and means for processing the received electronic spectrum requests in accordance with the spectrum re-allocation scheme and in accordance with the spectrum allocation scheme to re-allocate the spectrum resources to the plurality of RNs.

18. A radio network (RN) infrastructure utilizing a previously allocated spectrum resource, comprising:

at least one RN; and a device for generating an electronic spectrum request and for transmitting the electronic spectrum request via a communications network to a server infrastructure which also receives electronic spectrum requests for other RNs, wherein the spectrum allocation scheme is based on spectrum credits assigned with the RN or group of RNs, the spectrum credits relating to elementary spectrum units and being exchangeable into spectrum resources, the server infrastructure processing the received spectrum requests in accordance with a predefined spectrum re-allocation scheme and the spectrum allocation scheme to re-allocate a spectrum resources to the at least one RN.

* * * * *